(12) United States Patent
Leung et al.

(10) Patent No.: US 7,346,053 B1
(45) Date of Patent: Mar. 18, 2008

(54) METHODS AND APPARATUS FOR SUPPORTING IP MULTICAST FOR A MOBILE ROUTER

(75) Inventors: Kent K. Leung, Mountain View, CA (US); Daniel A. Alvarez, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1007 days.

(21) Appl. No.: 10/141,600

(22) Filed: May 7, 2002

(51) Int. Cl.
  *H04L 12/28* (2006.01)
(52) U.S. Cl. ........................................ 370/390; 370/338
(58) Field of Classification Search .................... None
  See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 5,572,528 A | 11/1996 | Shuen | |
| 5,572,582 A | 11/1996 | Riddle | |
| 5,619,552 A | 4/1997 | Karppanen et al. | |
| 5,729,537 A | 3/1998 | Billstrom | |
| 5,825,759 A | 10/1998 | Liu | |
| 5,862,345 A | 1/1999 | Okanoue et al. | |
| 6,078,575 A | 6/2000 | Dommety et al. | |
| 6,130,892 A | 10/2000 | Short et al. | |
| 6,195,705 B1 | 2/2001 | Leung | |
| 6,230,012 B1 | 5/2001 | Willkie et al. | |
| 6,339,830 B1 | 1/2002 | See et al. | |
| 6,370,142 B1 * | 4/2002 | Pitcher et al. | 370/390 |
| 6,393,482 B1 | 5/2002 | Rai et al. | 709/225 |
| 6,407,988 B1 | 6/2002 | Agraharam | |

(Continued)

FOREIGN PATENT DOCUMENTS

WO    03/043226 A1    5/2003

OTHER PUBLICATIONS

K. Leung et al, U.S. Appl. No. 09/752,884, filed Dec. 28, 2000, "Support Mobile Device In Asymmetric Link Environment."

(Continued)

*Primary Examiner*—Phirin Sam
(74) *Attorney, Agent, or Firm*—Beyer Weaver LLP (57) ABSTRACT

Methods and apparatus for supporting a Mobile IP mobile router are disclosed. A method of establishing a multicast session, thereby enabling multicast IP data packets to be transmitted to the multicast mobile router, include registering the mobile router with its Home Agent. Upon receipt of a registration reply from the Home Agent, the mobile router sends a join host group message. The join host group messages specifies a multicast group address and requests that a source or rendezvous point send packets destined to the multicast group address to a Foreign Agent to which the multicast mobile router has roamed when the multicast group address is a global scope address. Thus, multicast IP data packets may be received from the Home Agent when the data packets are addressed to an administrative scope address, while multicast IP data packets are received from the Foreign Agent when the data packets are addressed to a global scope address.

29 Claims, 8 Drawing Sheets

U.S. PATENT DOCUMENTS

| | | | |
|---|---|---|---|
| 6,434,134 | B1 | 8/2002 | La Porta et al. |
| 6,473,411 | B1 | 10/2002 | Kumaki et al. |
| 6,487,605 | B1 * | 11/2002 | Leung ............ 709/245 |
| 6,510,153 | B1 | 1/2003 | Inoue et al. |
| 6,512,754 | B2 | 1/2003 | Feder et al. |
| 6,515,974 | B1 | 2/2003 | Inoue et al. |
| 6,549,522 | B1 | 4/2003 | Flynn |
| 6,567,664 | B1 | 5/2003 | Bergenwall et al. |
| 6,571,289 | B1 | 5/2003 | Montenegro ............ 709/227 |
| 6,578,085 | B1 * | 6/2003 | Khalil et al. ............ 709/241 |
| 6,606,316 | B1 | 8/2003 | Albert et al. ............ 370/389 |
| 6,629,137 | B1 | 9/2003 | Wynn ............ 709/223 |
| 6,721,297 | B2 * | 4/2004 | Korus et al. ............ 370/338 |
| 6,731,621 | B1 | 5/2004 | Mizutani et al. |
| 6,738,362 | B1 | 5/2004 | Xu et al. |
| 6,747,961 | B1 | 6/2004 | Ahmed et al. |
| 6,766,168 | B1 | 7/2004 | Lim |
| 6,862,274 | B1 | 3/2005 | Tsao et al. |
| 6,947,401 | B2 * | 9/2005 | El-Malki et al. ............ 370/338 |
| 2002/0026525 | A1 * | 2/2002 | Armitage ............ 709/238 |
| 2002/0075878 | A1 | 6/2002 | Lee et al. ............ 370/401 |
| 2002/0080752 | A1 * | 6/2002 | Johansson et al. ............ 370/338 |
| 2002/0186693 | A1 | 12/2002 | Inoue et al. |
| 2003/0018715 | A1 * | 1/2003 | O'Neill ............ 709/204 |
| 2003/0021275 | A1 * | 1/2003 | Shabeer ............ 370/393 |
| 2003/0117965 | A1 | 6/2003 | Markki et al. |
| 2005/0213545 | A1 * | 9/2005 | Choyi et al. ............ 370/338 |

OTHER PUBLICATIONS

K. Leung, U.S. Appl. No. 09/746,409, filed Dec. 20, 2000, "Dynamic Network Allocation For Mobile Router."

T. Li, B. Cole, P. Morton and D. Li, "*Cisco Hot Standby Router Protocol (HSRP)*", Mar. 1998, Network Working Group RFC 2281.

Release notes for 3Com Corporation, "*Conducting a Redundant Route for Network Resiliency*", Mar. 1994, *NET Builder Family Bridge/Router*, pp. 26-29.

J. Moy, RFC 1247 "*OSPF Version 2.*", Jul. 19, 1991.

D. Oran, RFC 1142 "*OSI IS-IS Intra-Domain Routing Protocol*", Feb. 1990.

Uyless Black, "*TCP/IP and Related Protocols*", 1992, McGraw-Hill, Inc., pp. 226-249.

Chambless, et al., "*Home Agent Redundancy Protocol (HARP)*", Oct. 27, 1997.

Networking Working Group, RFC 2002 "*IP Mobility Support*", Oct. 1996.

C. Perkins, "*IP Mobility Support*", IBM Corporation, Oct. 1996.

"*Mobile IP*", Release 12.0(1) T, pp. 1-55.

Montenegro, G., "*Reverse Tunneling for Mobile IP*", RFC 2344, Sun Microsystems, Inc., pp. 1-19, May 1998.

D. Harkins and D. Carrel, "*The Internet Key Exchange (IKE)*", Cisco Systems, pp. 1-33, Jun. 1998.

D. Cong, M. Hamlen and C. Perkins, "*The Definitions of Managed Objects for IP Mobility Support Using SMIv2*", RFC 2006, Motorola and IBM, pp. 1-52, Oct. 1996.

C. Finseth, "*An Access Control Protocol, Sometimes Called TACACS*", RFC 1492, pp. 1-15, Sep. 13, 1992.

D. Carrel and Lol Grant, "*The TACACS+ Protocol*", Network Working Group, Internet-Draft, Cisco Systems, pp. 1-42, Jan. 1997.

C. Rigney, "*RADIUS Accounting*", RFC 2139, Livingston, pp. 1-25, Apr. 1997.

C. Rigney, et al., "*Remote Authentication Dial in User Service (RADIUS)*", RFC 2138, pp. 1-65, Apr. 1997.

\* cited by examiner

METHODS AND APPARATUS FOR SUPPORTING IP MULTICAST FOR A MOBILE ROUTER

BACKGROUND OF THE INVENTION

1. Field of the Invention

The present invention relates to Mobile IP network technology. More particularly, the present invention relates to supporting IP multicast for a mobile router in a Mobile IP environment.

2. Description of the Related Art p Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be enable to stay connected while roaming through various sub-networks. This is because the IP address required for any node to communicate over the internet is location specific. Each IP address has a filed that specifies the particular sub-network on which the node resides. If a user desires to take a computer which is normally attached to one node and roam with is so that is passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
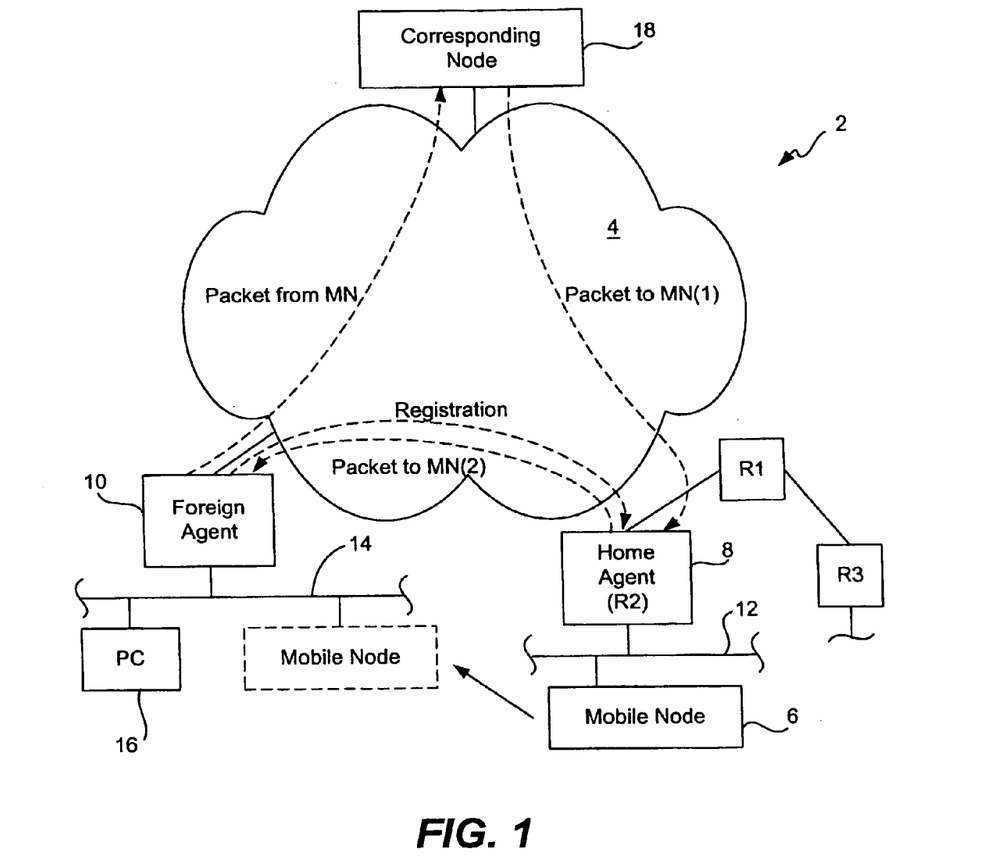
FIG. 1 is a diagram illustrating a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of-address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

IP multicasting is the transmission of an IP packet to a "host group" (i.e., multicast group), a set of zero or more hosts identified by a single IP destination address. RFC 112 sets forth the recommended standard for IP multicasting on the Internet. Internetwork forwarding of IP multicast packets is handled by "multicast routers" which may be co-resident with, or separate from, internet gateways. In addition, support for IP multicasting requires implementation of the Internet Group Management Protocol (IGMP). Thus, through IGMP, a node (e.g., receiver) may join a multicast group in order to receive packets addressed to that multicast group IP address.

Figure 2:
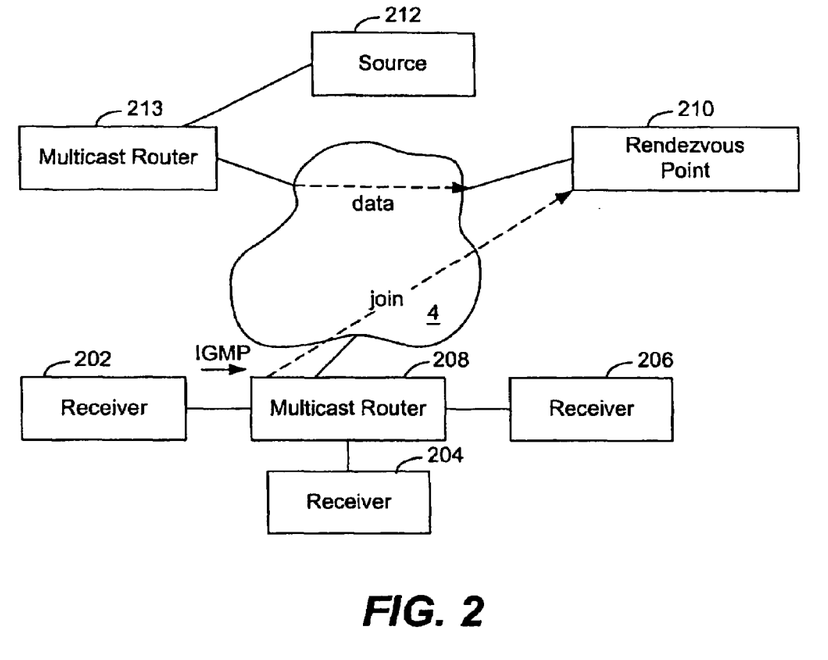
FIG. 2 is a block diagram illustrating IP multicast data flow in a fixed environment.

FIG. 2 is a block diagram illustrating IP multicast data flow in a fixed environment. As shown, multiple receivers 202, 204, and 206 may be coupled to a single multicast router 208. For instance, each receiver may be associated with a television capable of receiving multicast data. When the receiver 202 wants to listen to a particular multicast group IP address, the receiver 202 sends an IGMP report.

This may occur, for example, when a television viewer changes the channel on the television. An IGMP report, or "host membership report," report each host group to which the receiver belongs. In the normal case, only one report will be generated for each group present on the network by the first receiver to send such a report. This is sufficient since a multicast router need not know which hosts belong to a multicast group; only that at least one host belongs to a multicast group on a particular network. The host membership report indicates to the router 208 that multicast packets for that multicast group need to be replicated and forwarded. When the router 208 receives the IGMP report, the router 208 sends a join host group message toward a rendezvous point 210 which is recognized by other multicast routers in the network, including the receiver 202 and source 212. In other words, the rendezvous point 210 is established for communicating messages between the receiver 202 and the source 212. A join host group message specifies the multicast group address of the host group that the receiver 202 wishes to join. In addition, the join host group message serves to request that the receiving network module accept and deliver subsequently arriving packets destined to the specified IP multicast address. Moreover, the router 208 is aware of the location of the rendezvous point 210. The router 208 then sets up a data path between the router 208 and the rendezvous point 210 for the transmission and forwarding of multicast data from the rendezvous point 210 to the router 208. Thus, when the source 212 sends streaming data (e.g., television channel or stock information), multicast router 213 directly connected to the source 212 will deliver the data to the rendezvous point 210. The rendezvous point 210 then forwards the data to the router 208. The router 208 then makes copies of the packet and sends the packet to each subnet with receiver that has joined that particular multicast group. In this example, the router 208 sends the packet to the receiver 202. If any other receivers (e.g., 204, 206) have joined the multicast group, copies of the packet are sent to these receivers as well, if they are on different subnets.

It is important to note that for multicast data transmission, packets must be replicated for transmission to the appropriate receivers. However, in a Mobile IP environment, the designated method of replication of packets is specifically addressed by RFC 2002. RFC 2002 defines a method to support IP multicast data transmission in a Mobile IP environment. More particularly, RFC 2002 specifically requires that the Home Agent replicate broadcast and multicast data packets for transmission to multiple devices (e.g., mobile nodes) destined to receive the packets.

Although RFC 2002 enables IP multicast data to be transmitted in a Mobile IP environment, this method is sub-optimal, since it requires the Home Agent to duplicate multicast packets for transmission to each mobile node via a tunnel to the Foreign Agent. This replication by the Home Agent is required, even if all mobile node are visiting the same Foreign Agent. It is important to note that the distance between the Home Agent and the Foreign Agent may be substantial, consuming network bandwidth and switch processing during the replication process. In view of the above, it would be desirable to optimize IP multicast data transmission in a Mobile IP environment. Moreover, it would be beneficial if such optimization could be implemented to support mobility of a router in a Mobile IP environment.

SUMMARY OF THE INVENTION

The present invention provides an optimization to IP multicast data transmission. More specifically, the present invention enables IP multicast data addressed to an administrative scope group address to be tunneled by the Home Agent, in accordance with Mobile IP processing. However, when the IP multicast data is addressed to a global scope group address, the data is sent directly to the Foreign Agent, utilizing the most optimal path.

In accordance with one aspect of the invention, a method of establishing a multicast session, thereby enabling multicast IP data packets to be transmitted to the multicast mobile router, includes registering the mobile router with its Home Agent. Upon receipt of a registration reply from the Home Agent, the mobile router sends a join host group message. More specifically, when the multicast group is within the multicast global range, the join host group message is sent to the Foreign Agent. The join host group message specifies a multicast group address and requests that a source or rendezvous point send packets destined to the multicast group address to a Foreign Agent to which the multicast mobile router has roamed when the multicast group address is a global scope address.

In accordance with another aspect of the invention, when the multicast group is within the administrative scoped range, the join host group message for that group is sent to the Home Agent (e.g., via a Mobile IP tunnel between the multicast mobile router and the Home Agent). More specifically, the join host group message specifies a multicast group address and requests that a source or rendezvous point send packets destined to the multicast group address to the Home Agent when the multicast group address is an administrative scope address. Thus, multicast IP data packets may be received from the Home Agent when the data packets are addressed to an administrative scope address, while multicast IP data packets are received from the Foreign Agent when the data packets are addressed to a global scope address.

In accordance with another aspect of the invention, a multicast tree is pruned in association with a mobile router. More specifically, a Foreign Agent previously visited by the mobile router receives a message indicating that the mobile router is not longer visiting the Foreign Agent. For instance, this message may be transmitted by the Home Agent or the mobile router. The Foreign then sends a prune message to a multicast group address associated with the mobile router on an interface of the Foreign Agent where the mobile router was connected. If no responses are received in reply to the prune message, there are no other nodes on this interface that have joined this multicast group. Thus, the Foreign Agent removes the entry associated with the multicast group address from its multicast routing table.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 3:
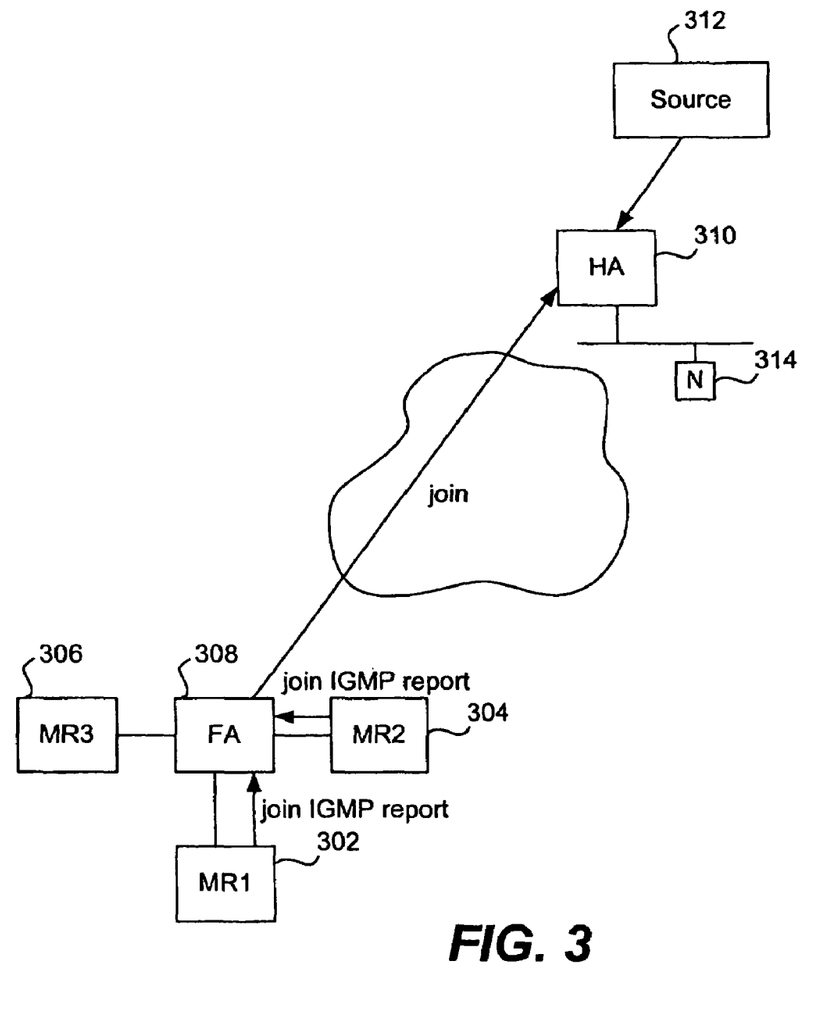
FIG. 3 is a block diagram illustrating a system in which a multicast mobile router may be implemented in a Mobile IP environment in accordance with an embodiment of the invention.

FIG. 3 is a block diagram illustrating a system in which multicast mobile router may be implemented in a Mobile IP environment in accordance with an embodiment of the invention. As shown, multiple mobile routers 302, 304, and 306 may be visiting a Foreign Agent 308. The present invention establishes a data path for multicast data transmission, enabling data packets to be transmitted directly to a Foreign Agent from a rendezvous point or source rather than being initially transmitted to the Home Agent. When the mobile routers 302, 304 and 306 join a multicast group, they each separately send a join IGMP report to the Foreign Agent 308. In response to receiving the join IGMP report, the mobile router sends a join host group message to the Home Agent 310 supporting the mobile nodes 302, 304. The Home Agent typically forwards data addressed to a mobile node supported by it to the mobile node's current care-of address. In addition, multicast data packets must be replicated for transmission to multiple receivers, which is typically performed by the Home Agent. However, in accordance with the present invention, data packets addressed to a global scoped address (rather than administrative scope address) are sent directly to the Foreign Agent 308 rather than to the Home Agent 310. Thus, replication is performed at the Foreign Agent 308 or by an associated multicast router (not shown), which may be implemented separately from the Foreign Agent 308 or combined with the Foreign Agent 308 as a single entity.

Figure 4:
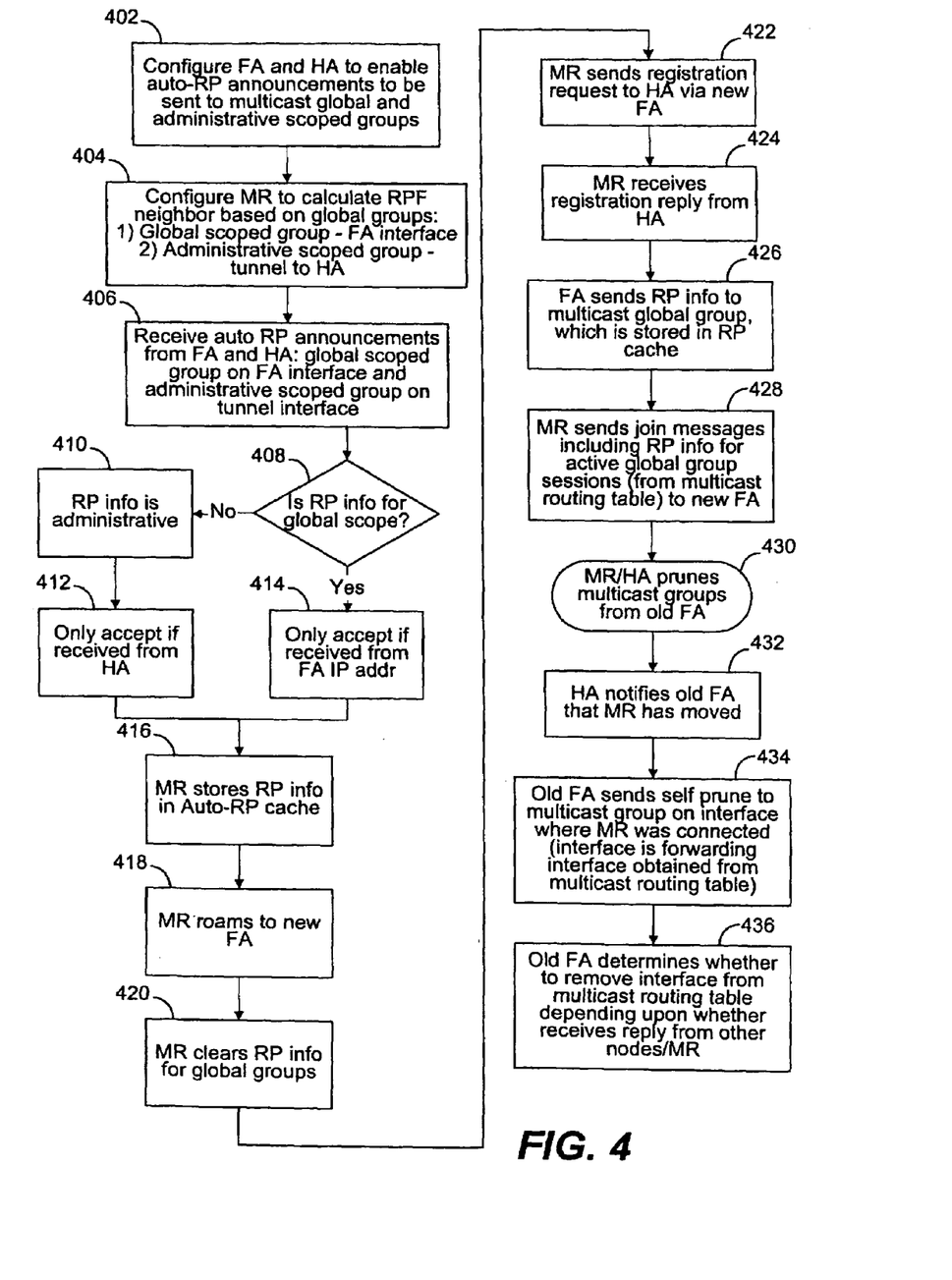
FIG. 4 is a control flow diagram illustrating a method of supporting IP multicast for a mobile router in accordance with various embodiments of the invention.

FIG. 4 is a control flow diagram illustrating a method of supporting IP multicast for a mobile router in accordance with various embodiments of the invention. As shown in block 402, Foreign Agents and Home Agents are preferably configured to automatically and periodically transmit rendezvous point (RP) information. More particularly, the RP information preferably indicates a RP IP address. For instance, the RP information may be sent in an auto-RP announcement that is addressed to a multicast global or administrative scope group.

In addition, the multicast mobile router is preferably configured as shown at block 404 to calculate a reverse path forwarding (RPF) neighbor based upon global scope address when the multicast group address that the mobile router has joined is a global scope address. In other words, the RPF neighbor typically points to a tunnel interface to the Home Agent. However, in accordance with various embodiments of the invention, the multicast mobile router is configured to receive multicast IP data packets addressed to a global scope address via a Foreign Agent interface. Thus, the RPF forwarding neighbor is the Foreign Agent for global scope groups. Multicast IP data packets addressed to an administrative scope address will continue to be received and forwarded via the Home Agent. Typically, the RPF interface/neighbor is calculated by choosing the interface/neighbor with the best unicast routing metric for the source address of the multicast packet, or by choosing the RPF interface/neighbor with the best unicast routing metric for the Rendezvous Point address (the address used for the RPF calculation for shared trees). However, in accordance with various embodiments of the invention, the destination address (i.e., multicast group address) of the multicast packet is used to select the RPF neighbor/interface.

The mobile router may determine the RP address. For instance, the RP information (e.g., announcements) is preferably received from the Foreign Agent and/or the Home Agent at block 406. As described above, those announcements addressed to a global scope group will be received from the Foreign Agent, while those announcements addressed to an administrative scope group will continue to be received from the Home Agent. Thus, at block 408 the mobile router determines whether the RP announcement is addressed to a global scope address. If the RP information is not addressed to a global scope address as shown at block 410, the mobile router only accepts the announcement if the announcement is received from the Home Agent as shown at block 412. Similarly, if the RP information is addressed to a global scope group address, the mobile router only accepts the announcement if it has been received from a Foreign Agent at block 414. For instance, the announcement should include the IP address of the Foreign Agent as the source address of the announcement.

When the mobile router receives the RP information, it preferably stores this information in a cache as shown at block 416. For instance, the RP information may include a RP IP address and associated multicast address. An exemplary cache maintained by the mobile router will be described in further detail below with reference to FIG. 6.

As described above, the mobile router receives multicast data via the Foreign Agent when the data is addressed to a global scope group. Thus, as the mobile router roams, it will reconfigure the RP information such that multicast data may be received via the new Foreign Agent (rather than the Foreign Agent that was previously visited by the mobile router). When the mobile router roams to a new Foreign Agent at block 418, the mobile router deletes the RP information associated with the global scope address at block 420. When the mobile router sends a registration request to the Home Agent at block 422, it receives a registration reply at block 424. Upon successful registration of the mobile router with the Home Agent, the Foreign Agent sends RP information to the multicast global group at block 426, which is stored (e.g., in a cache). The RP information preferably identifies the RP IP address associated with the global group. The mobile router than sends a join host group message to a source or rendezvous point at block 428 for active global group sessions to the new Foreign Agent. For instance, the mobile router may identify an active global group session from a multicast routing table to ascertain the global scope address for that session. More particularly, the join host group message specifies a multicast global scope group address and requests that the source of rendezvous point send packets destined to the multicast group address to a Foreign Agent to which the mobile router has roamed (the reverse path forwarding neighbor). Thus, the join host group message includes the RP information (e.g., identifies the RP as well as the global group).

Either the mobile router or the Home Agent may prune multicast groups from the previously visited Foreign Agent at blocks 430-436. For instance, the mobile router or the Home Agent notifies the previous Foreign Agent that the mobile router has moved at block 432, and therefore no longer visiting the previous Foreign Agent. The mobile router than ascertains a multicast group address associated with the multicast mobile router. For instance, as shown at block 434 the mobile router may locate an entry for the mobile router in a multicast routing table to ascertain a multicast address associated with the mobile router. In addition, an interface of the Foreign Agent where the multicast mobile router was connected may be identified from the entry in the multicast routing table as a forwarding interface. The previous Foreign Agent then sends a prune message to the multicast group address associated with the multicast mobile router on the interface of the Foreign Agent where the multicast mobile router was connected. Any nodes remaining on that interface that belongs to the multicast global group address may then reply to the prune message to indicate that they are still on that interface. If no responses are received in reply to the prune message, the mobile router removes the entry associated with the multicast group address from its multicast routing table at block 436. In this manner, a multicast tree may be pruned.

Figure 5:
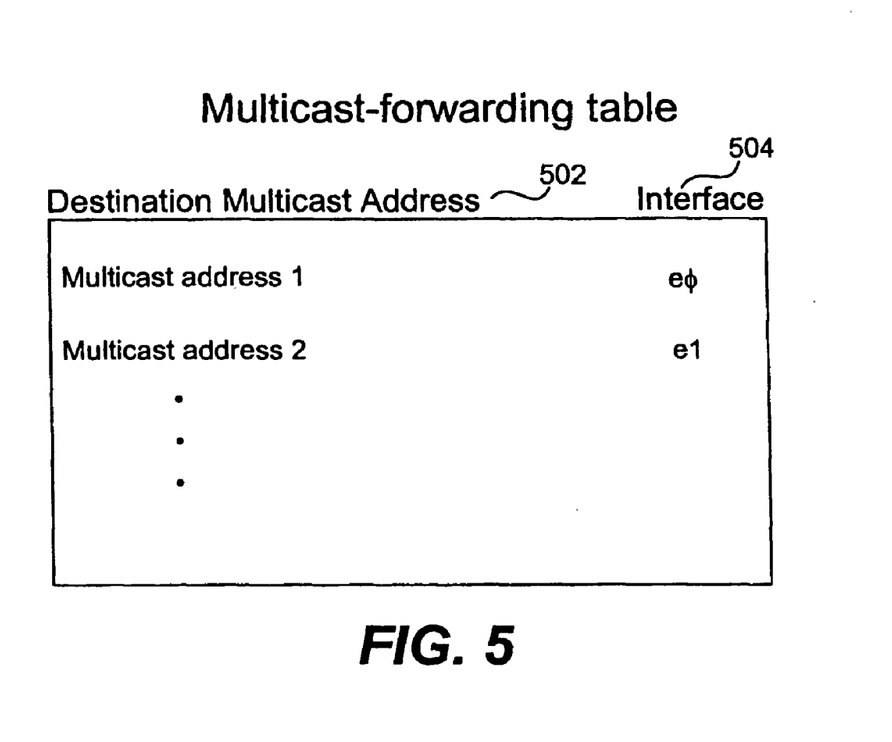
FIG. 5 is a diagram illustrating an exemplary multicast forwarding table that may be accessed by the Foreign Agent at block 428 of FIG. 4.

FIG. 5 is a diagram illustrating an exemplary multicast forwarding table that may be accessed by the mobile router at block 428 of FIG. 4. As described above, the multicast mobile router checks a multicast forwarding table in order to determine the interfaces (physical or tunnel) that are to receive multicast data packets. As shown, a multicast forwarding table associates each multicast address 502 with one or more interfaces 504 that have indicated that they want to listen to the multicast group address 502 identified. In this manner, a list of host group memberships associated with each network interface is maintained. The list is typically updated in response to a join or leave host group message. Thus, when a reply is received from a node or mobile router in response to a prune message, the mobile router does not delete the entry in its multicast routing table. However, if no replies are received in response to its prune message, the mobile router simply performs a table look up for the associated multicast address (e.g., global group address) in its multicast routing table and deletes the entry from its table.

Figure 6:
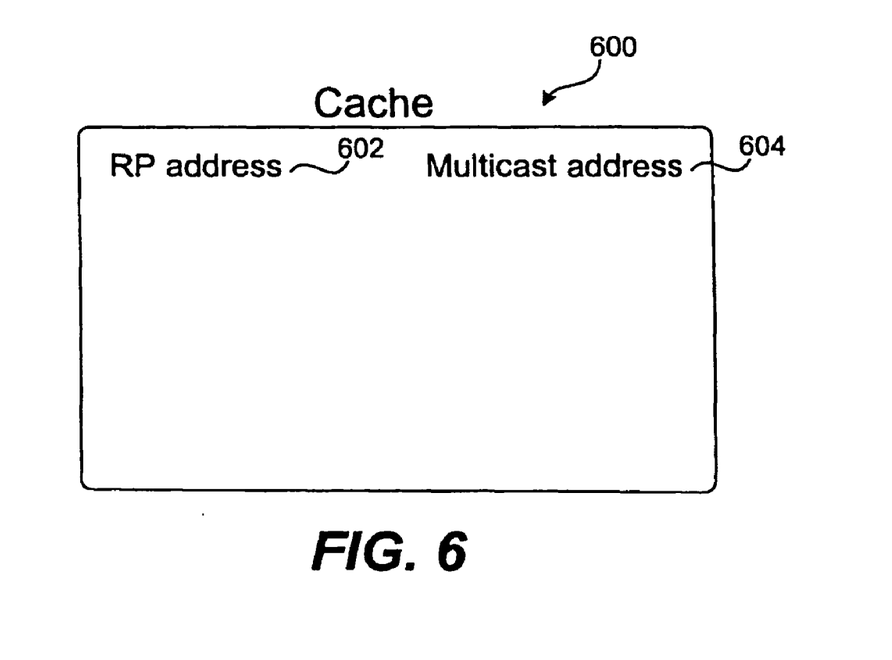
FIG. 6 is a diagram illustrating an exemplary cache maintained by a mobile router in accordance with various embodiments of the invention.

FIG. 6 is a diagram illustrating an exemplary cache maintained by a mobile router in accordance with various embodiments of the invention. As shown, the cache 600 includes one or more IP addresses associated with one or more rendezvous points. In addition, each rendezvous point 602 may be associated with one or more multicast addresses 604.

Figure 7:
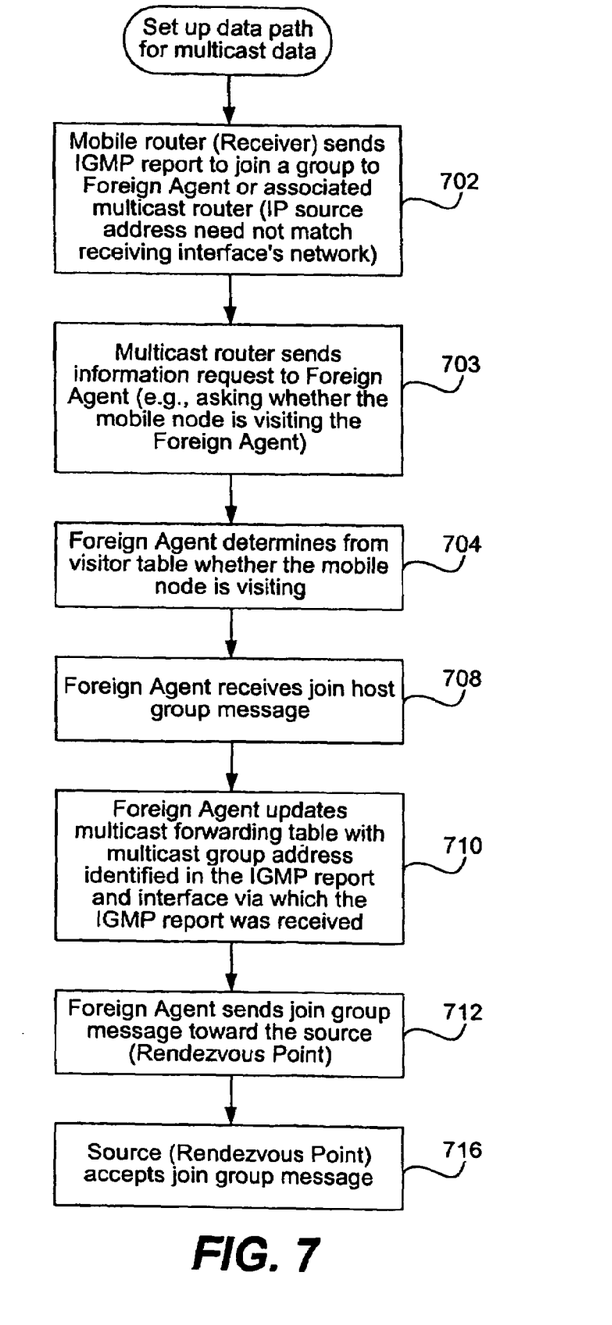
FIG. 7 is a process flow diagram illustrating one method of setting up a data path for multicast data in accordance with one embodiment of the invention.

FIG. 7 is a process flow diagram illustrating one method of setting up a data path for multicast data in accordance with one embodiment of the invention. When a mobile router wishes to join a multicast group, the mobile router as the receiver sends a host membership report (i.e., IGMP report) to the Foreign Agent (or associated multicast router) at block 702. The host membership report specifies a multicast group address identifying a host group to which the mobile router belongs. In addition, a message (i.e., information request) may be sent to the Foreign Agent at block 702 asking the Foreign Agent whether the mobile router is allowed to join the host group. For example, the message may ask the Foreign Agent whether the mobile router is visiting the Foreign Agent. The Foreign Agent then determines from visitor table whether the mobile router is visiting the Foreign Agent at block 704. The Foreign Agent receives the join host group message from the mobile router at block 708. The Foreign Agent (or associated multicast router) may also update a multicast forwarding table with the multicast group address identified in the IGMP report as well as the interface via which the IGMP report was received at block 710. The Foreign Agent then sends the join group message toward the source (i.e., rendezvous point) at block 712. The source (i.e., rendezvous point) accepts the join group message at block 716. If the source does not accept the join group message, pruning may subsequently be performed to update the data path previously created.

Figure 8:
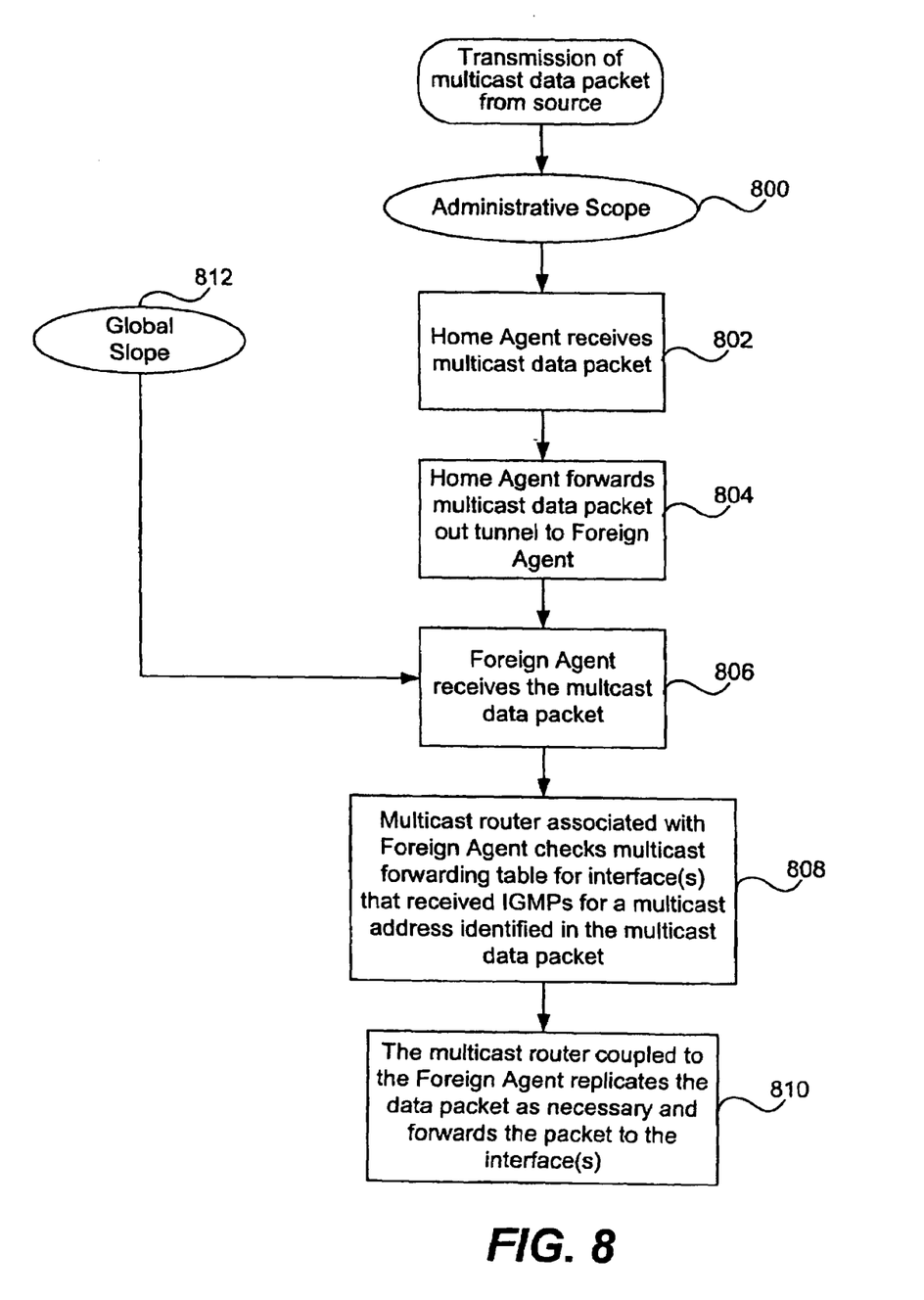
FIG. 8 is a process flow diagram illustrating one method of sending multicast packets from a source in accordance with one embodiment of the invention.

Once the data path is established for transmission of multicast data packets, the source may transmit multicast data packets to a rendezvous point. FIG. 8 is a process flow diagram illustrating one method of sending multicast packets from a source in accordance with one embodiment of the invention. As shown at block 800, when the multicast data packet is addressed to an administrative scope group address, the Home Agent receives a multicast packet from the source at block 802. The Home Agent then forwards the multicast data packet out the tunnel previously created to the Foreign Agent at block 804. The Foreign Agent receives the multicast data packet at block 806. The Foreign Agent or associated multicast router then replicates the data packet as appropriate and forwards the data packet to each network associated with one or more mobile nodes. In other words, the Foreign Agent need not replicate the data packet for mobile nodes on the same network segment. Thus, the Foreign Agent need only determine the network(s) that should receive the multicast data packet. One method for determining the network(s) to receive the packet is to identify the associated interfaces on the Foreign Agent. More particularly, the Foreign Agent (or associated multicast router) checks a multicast forwarding table for interface(s) that received IGMP reports for a multicast address identified in the associated multicast data packet 808. The Foreign Agent (or associated multicast router) then replicates the data packet as necessary and forwards the packet to the interface(s) at block 810.

As shown at block 812, when the multicast data packet is addressed to a global scope group, the packet is sent directly to the Foreign Agent. Thus, steps 802 and 804 need not be performed. In this manner, the present invention optimizes multicast IP data transmission in association with a mobile router when the IP multicast data is addressed to a global scope group rather than an administrative scope group.

The invention can also be embodied as computer readable code on a computer readable medium. The computer readable medium is any data storage device that can store data which can thereafter be read by a computer system. Examples of the computer readable medium include read-only memory, random-access memory, CD-ROMS, magnetic tape, and optical data storage devices.

The apparatus (Home Agent, Foreign Agent, multicast router and/or node) of this invention may be specially constructed for the required purposes, or may be a general purpose programmable machine selectively activated or reconfigured by a computer program stored in memory. In addition, the multicast router of the present invention is preferably capable of supporting multicast Reverse Path Forwarding (RPF), which is supported by specially configured router models 2600, 3200, 3600, 4700, 7200, 7500, and 12000. The processes presented herein are not inherently related to any particular router or other apparatus. In a preferred embodiment any of the Home and Foreign Agents of this invention may be specially configured routers such as specially configured router models 2500, 2600, 3600, 4000, 4500, 4700, 7200, and 7500 available Cisco Systems, Inc. of San Jose, Calif. A general structure for some of these machines will appear from the description given below.

Generally, the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the routers of the present invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the present invention may be implemented on a general-purpose network host machine such as a personal computer or workstation. Further, the invention may be at least partially implemented on a card (e.g., an interface card) for a network device or a generally-purpose computing device.

Figure 9:
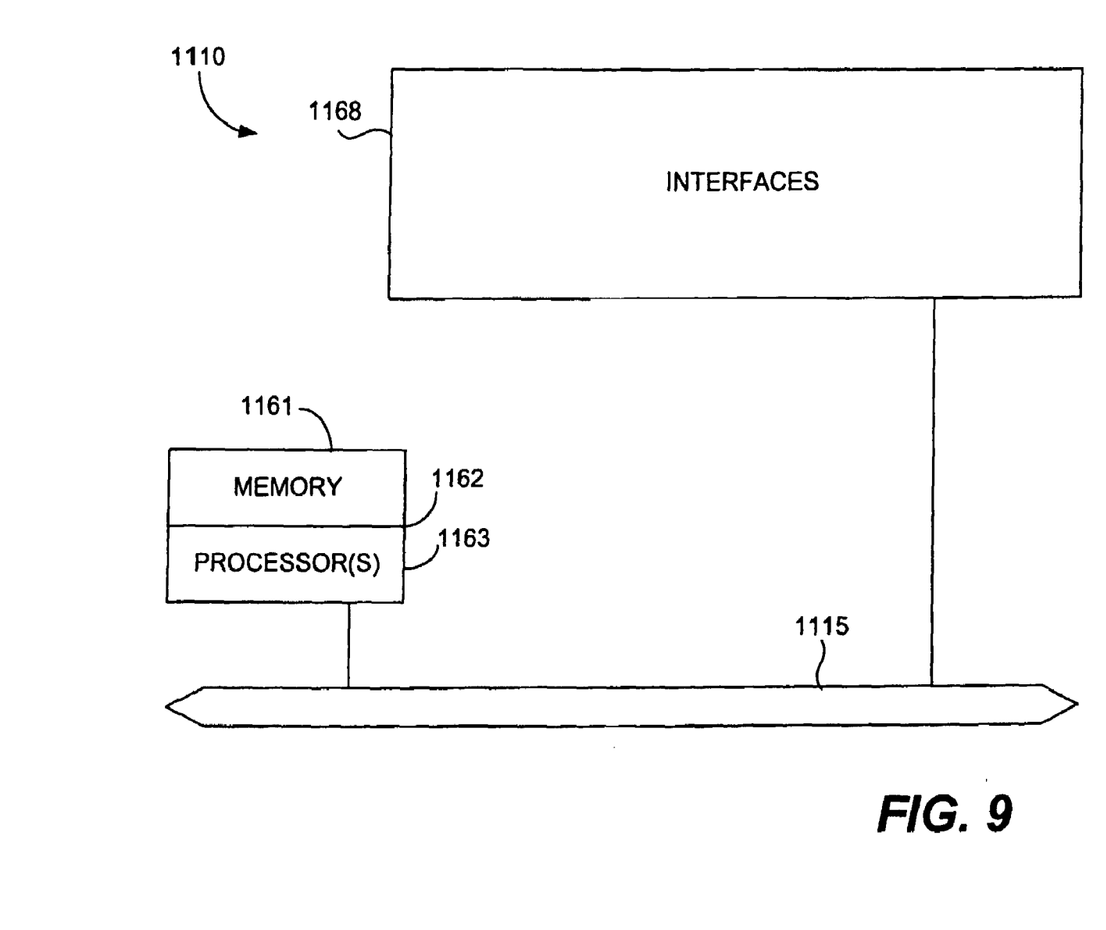
FIG. 9 is a block diagram of a network device that may be configured to implement aspects of the present invention.

Referring now to FIG. 9, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CUP 1162 may include one or more processors 1163 such as a processor form the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions. etc.

Although the system shown in FIG. 9 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1116) configured to store program instructions for the general-purpose network operations and mechanisms for registration and routing functions described herein. The program instructions may control the operation of an operating system and/or one or more applications, for example. The memory or memories may also be configured to store tables such as mobility binding and visitor tables, etc.

Because such information and program instructions may be employed to implement the system/methods described herein, the present invention relates to machine readable media that include program instructions, state information, etc. for performing various operations described herein. Examples of machine-readable media include, but are not limited to, magnetic media such as hard disks, floppy disks, and magnetic tap; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. In a multicast mobile router supporting Mobile IP, a method of establishing a multicast session, thereby enabling multicast IP data packets to be transmitted to the multicast mobile router, comprising:
   sending a registration request to a Home Agent via a Foreign Agent to which the multicast mobile router has roamed;
   receiving a registration reply from the Home Agent; and
   sending a join host group message, the join host group message specifying a multicast group address and requesting that a source or rendezvous point send packets destined to the multicast group address to a Foreign Agent to which the multicast mobile router has roamed when the multicast group address is a global scope address, thereby enabling data packets addressed to the global scope address to be transmitted to the Foreign Agent without interception by the Home Agent.

2. A multicast mobile router supporting Mobile IP and adapted for establishing a multicast session, thereby enabling multicast IP data packets to be transmitted to the multicast mobile router, comprising:
   a processor; and
   a memory, at least one of the processor or the memory being adapted for;
   sending a registration request to a Home Agent via a Foreign Agent to which the multicast mobile router has roamed;

receiving a registration reply from the Home Agent;
sending a join host group message, the join host group message specifying a multicast group address and requesting that a source or rendezvous point send packets destined to the multicast group address to a Foreign Agent to which the multicast mobile router has roamed when the multicast group address is a global scope address, thereby enabling data packets addressed to the global scope address to be transmitted to the Foreign Agent without interception by the Home Agent; and
sending a second join host group message to the Home Agent via a Mobile IP tunnel between the multicast mobile router and the Home Agent when the multicast group address is an administrative scope address.

3. The multicast mobile router as recited in claim 2, wherein the second join host group message specifies a multicast group address and requests that a source of rendezvous point send packets destined to the multicast group address to the Home Agent when the multicast group address is an administrative scope address.

4. A multicast mobile router supporting Mobile IP and adapted for establishing a multicast session, thereby enabling multicast IP data packets to be transmitted to the multicast mobile router, comprising:
   a processor; and
   a memory, at least one of the processor or the memory being adapted for;
   sending a registration request to a Home Agent via a Foreign Agent to which the multicast mobile router has roamed;
   receiving a registration reply from the Home Agent; and
   sending a join host group message, the join host group message specifying a multicast group address and requesting that a source or rendezvous point send packets destined to the multicast group address to a Foreign Agent to which the multicast mobile router has roamed when the multicast group address is a global scope address, thereby enabling data packets addressed to the global scope address to be transmitted to the Foreign Agent without interception by the Home Agent.

5. The multicast mobile router as recited in claim 4, at least one of the processor or the memory being further adapted for:
   sending the join host group message to the Foreign Agent.

6. The multicast mobile router as recited in claim 4, at least one of the processor or the memory being further adapted for:
   receiving one or more multicast IP data packets addressed to an administrative scope address via a tunnel interface.

7. The multicast mobile router as recited in claim 4, at least one of the processor or the memory being further adapted for:
   receiving one or more multicast IP data packets addressed to a global scope address via a Foreign Agent interface.

8. The multicast mobile router as recited in claim 4, wherein the multicast mobile router is configured to receive multicast IP data packets addressed to a global scope address via a Foreign Agent interface.

9. The multicast mobile router as recited in claim 4, wherein the multicast mobile router is configured to calculate a reverse path forwarding neighbor based upon global scope address when the multicast group address that the multicast mobile router has joined is a global scope address.

10. The multicast mobile router as recited in claim 4, at least one of the processor or the memory being further adapted for:
    receiving rendezvous point information from at least one of a Foreign Agent or a Home Agent, the rendezvous point indicating a rendezvous point address;
    determining whether the rendezvous point information is addressed to a global scope address or an administrative scope address;
    accepting the rendezvous point information if it is determined to be addressed to a global scope address when the rendezvous point information is received from the Foreign Agent; and
    accepting the rendezvous point information if it is determined to be addressed to an administrative scope address when the rendezvous point information is received from the Home Agent.

11. The multicast mobile router as recited in claim 10, at least one of the processor or the memory being further adapted for:
    storing the rendezvous point information.

12. The multicast mobile router as recited in claim 11, at least one of the processor or the memory being further adapted for:
    deleting the rendezvous point information associated with global scope address after the multicast mobile router roams to another Foreign Agent.

13. The multicast mobile router as recited in claim 4, at least one of the processor or the memory being further adapted for:
    receiving rendezvous point information from a Foreign Agent when the mobile router successfully registers with the Home Agent.

14. The multicast mobile router as recited in claim 13, wherein the rendezvous point information indicates a rendezvous point address associated with the global scope address.

15. The multicast mobile router as recited in claim 4, at least one of the processor or the memory being further adapted for:
    identifying from a multicast table an active global group session to ascertain the global scope address.

16. The multicast mobile router as recited in claim 4, wherein the Foreign Agent is a reverse path forwarding neighbor, the join host group message requesting that packets destined to the multicast group address be sent to the reverse path forwarding neighbor.

17. The multicast mobile router as recited in claim 4, at least one of the processor or the memory being further adapted for:
    identifying the rendezvous point associated with the multicast group address prior to sending the join host group message.

18. A multicast mobile router supporting Mobile IP and adapted for establishing a multicast session, thereby enabling multicast IP data packets to be transmitted to the multicast mobile router, comprising:
    means for sending a registration request to a Home Agent via a Foreign Agent to which the multicast mobile router has roamed;
    means for receiving a registration reply from the Home Agent; and
    means for sending a join host group message, the join host group message specifying a multicast group address and requesting that a source or rendezvous point send packets destined to the multicast group address to a Foreign Agent to which the multicast mobile router has roamed when the multicast group address is a global scope address, thereby enabling data packets addressed to the global scope address to be transmitted to the Foreign Agent without interception by the Home Agent.

19. A computer-readable medium storing thereon computer-readable instructions for establishing a multicast session by a multicast mobile router supporting Mobile IP, thereby enabling multicast IP data packets to be transmitted to the multicast mobile router, comprising:
  instructions for sending a registration request to a Home Agent via a Foreign Agent to which the multicast mobile router has roamed;
  instructions for receiving a registration reply from the Home Agent; and
  instructions for sending a join host group message, the join host group message specifying a multicast group address and requesting that a source or rendezvous point send packets destined to the multicast group address to a Foreign Agent to which the multicast mobile router has roamed when the multicast group address is a global scope address, thereby enabling data packets addressed to the global scope address to be transmitted to the Foreign Agent without interception by the Home Agent.

20. In a Foreign Agent that supports Mobile IP, a method of pruning a multicast tree, comprising:
  receiving a message indicating that a multicast mobile router is no longer visiting the Foreign Agent;
  ascertaining a multicast group address associated with the multicast mobile router;
  sending a prune message to the multicast group address associated with the multicast mobile router on an interface of the Foreign Agent where the multicast mobile router was connected; and
  removing an entry associated with the multicast group address from a multicast routing table when no responses are received in replay to the prune message.

21. A Foreign Agent that supports Mobile IP and adapted for pruning a multicast tree, comprising:
  a processor; and
  a memory, at least one of the processor or the memory being adapted for:
  receiving a message indicating that a multicast mobile router is no longer visiting the Foreign Agent;
  ascertaining a multicast group address associated with the multicast mobile router;
  sending a prune message to the multicast group address associated with the multicast mobile router on an interface of the Foreign Agent where the multicast mobile router was connected; and
  removing an entry associated with the multicast group address from a multicast routing table when no responses are received in reply to the prune message.

22. The Foreign Agent as recited in claim 21, wherein the message is received from the multicast mobile router.

23. The Foreign Agent as recited in claim 21, wherein the message is received from a Home Agent associated with the multicast mobile router.

24. The Foreign Agent as recited in claim 21, wherein ascertaining a multicast address comprises:
  locating an entry for the multicast mobile router in a multicast routing table; and
  ascertaining a multicast address associated with the multicast mobile router from the entry located in the multicast routing table.

25. The Foreign Agent as recited in claim 21, at least one of the processor or the memory being further adapted for:
  identifying the interface of the Foreign Agent where the multicast mobile router was connected from an entry in a multicast routing table.

26. The Foreign Agent as recited in claim 21, wherein removing an entry associated with the multicast group address from a multicast routing table when no responses are received in reply to the prune message comprises:
  removing an entry from the multicast routing table, the entry being associated with the multicast group address and identifying the interface of the Foreign Agent as a forwarding interface.

27. The Foreign Agent as recited in claim 21, wherein the multicast group address is a global scope address.

28. A Foreign Agent that supports Mobile IP and adapted for pruning a multicast tree, comprising:
  means for receiving a message indicating that a multicast mobile router is no longer visiting the Foreign Agent;
  means for ascertaining a multicast group address associated with the multicast mobile router;
  means for sending a prune message to the multicast group address associated with the multicast mobile router on an interface of the Foreign Agent where the multicast mobile router was connected; and
  means for removing an entry associated with the multicast group address from a multicast routing table when no responses are received in reply to the prune message.

29. A computer-readable medium storing thereon computer-readable instructions for pruning a multicast tree in a Foreign Agent that supports Mobile IP, comprising:
  instructions for receiving a message indicating that a multicast mobile router is no longer visiting the Foreign Agent;
  instructions for ascertaining a multicast group address associated with the multicast mobile router;
  instructions for sending a prune message to the multicast group address associated with the multicast mobile router on an interface of the Foreign Agent where the multicast mobile router was connected; and
  instructions for removing an entry associated with the multicast group address from a multicast routing table when no responses are received in reply to the prune message.

* * * * *